April 12, 1932.  J. JAEGERHUBER  1,854,036
DIFFERENTIAL AND FREE WHEELING MECHANISM
Filed Oct. 12, 1931  2 Sheets-Sheet 1
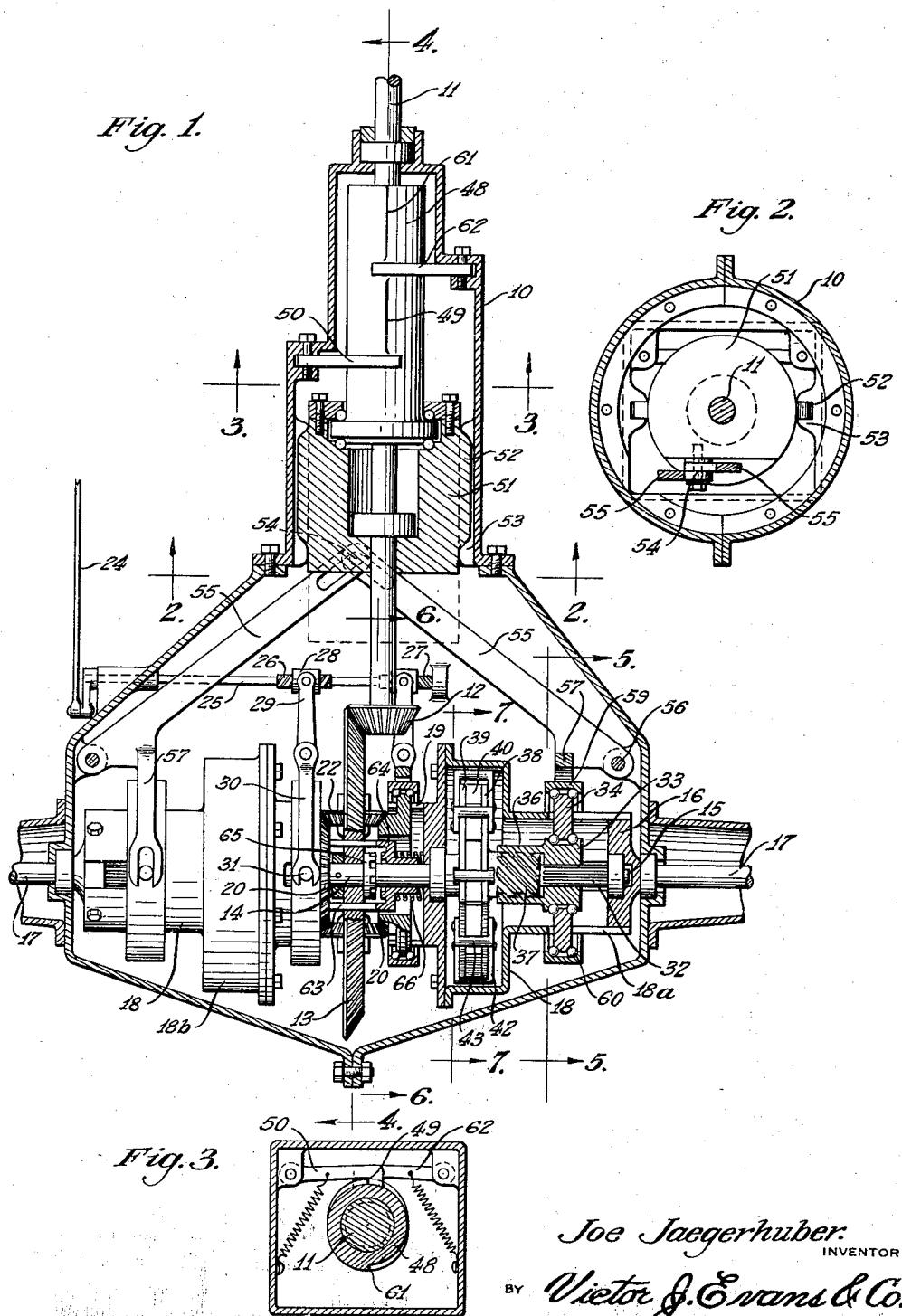
Joe Jaegerhuber,
INVENTOR
BY Victor J. Evans & Co.
HIS ATTORNEYS April 12, 1932. J. JAEGERHUBER 1,854,036
DIFFERENTIAL AND FREE WHEELING MECHANISM
Filed Oct. 12, 1931 2 Sheets-Sheet 2
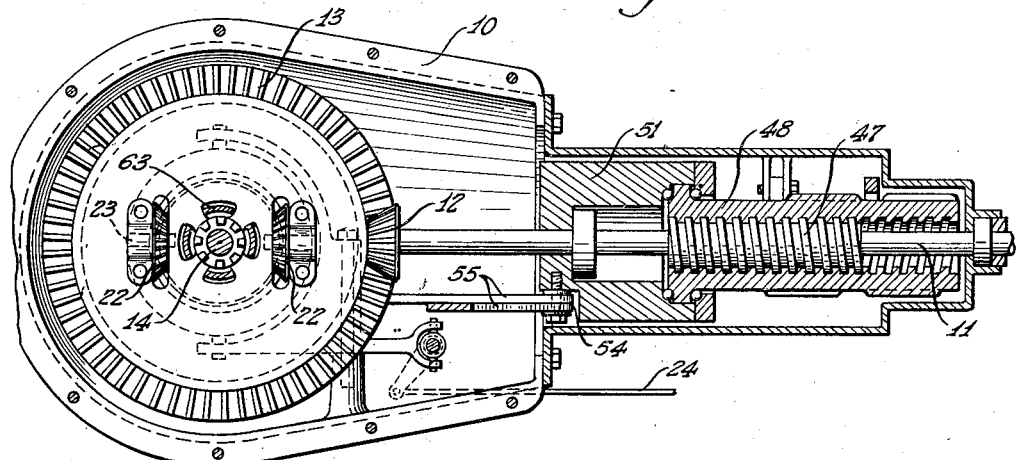
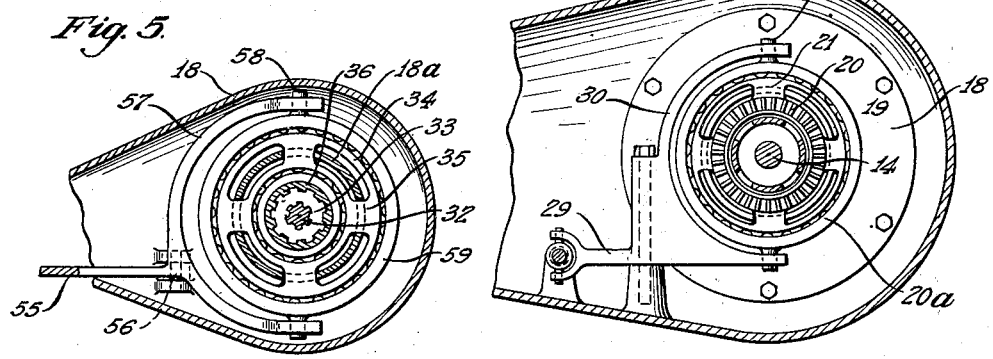
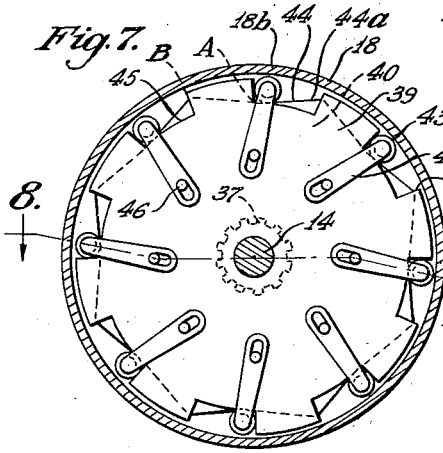
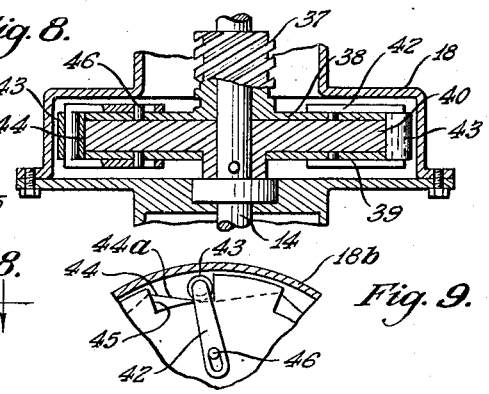
Joe Jaegerhuber, INVENTOR
BY Victor J. Evans & Co
HIS ATTORNEYS Patented Apr. 12, 1932

1,854,036

UNITED STATES PATENT OFFICE

JOE JAEGERHUBER, OF CHICAGO, ILLINOIS

DIFFERENTIAL AND FREE WHEELING MECHANISM

Application filed October 12, 1931. Serial No. 568,504.

This invention relates to certain novel improvements in differential and free wheeling mechanism, and has for its principal object the provision of an improved construction of this character which will be highly efficient in use and economical in manufacture.

It is an object of this invention to provide a novel and efficient free wheeling mechanism for automotive vehicles and to associate the same with the differential mechanism in such a manner that the free wheeling mechanism may be readily rendered effective and ineffective by the operator of the vehicle.

Another object of the invention is to provide a mechanism that will distribute power uniformly to both rear wheels so that in the event the vehicle becomes stalled in mud or on a slippery road power will be delivered uniformly to both wheels whereby if only one wheel has traction the same will be able to move the vehicle, which overcomes a difficulty now experienced with differentials since in the latter if one wheel has traction and the other has not the differential throws most of the power to the latter.

Other objects will appear hereinafter.

The invention consists in the novel combination and arrangement of parts to be hereinafter described and claimed.

The invention will be best understood by reference to the accompanying drawings, showing the preferred form of construction, and in which:

Fig. 1 is a plan view of the invention partly in section;

Fig. 2 is a sectional view on line 2—2 in Fig. 1;

Fig. 3 is a sectional view on line 3—3 in Fig. 1;
Fig. 4 is a sectional view on line 4—4 in Fig. 1;

Fig. 5 is a sectional view on line 5—5 in Fig. 1;

Fig. 6 is a sectional view on line 6—6 in Fig. 1;

Fig. 7 is a sectional view on line 7—7 in Fig. 1;

Fig. 8 is a sectional view on line 8—8 in Fig. 7; and

Fig. 9 is a fragmentary side elevation of a part of the invention shown in Fig. 6.

Referring to the drawings, which illustrate a preferred and practical embodiment of the invention, 10 indicates an automotive vehicle differential housing in which is journaled the drive shaft 11 which carries a pinion 12 that normally meshes with a ring or master gear 13 that floats on the driven shaft 14. The ends 15 of the shaft 14 are journaled in bearings 16 that are integral with the axle shafts 17. Each of the bearings 16 is integral with a housing 18 that includes fingers 19 which project between the spokes 21 in a beveled gear body 20. This gear 20 meshes with planetary beveled gears 22 mounted on stub shafts 23 carried by the gear 13 (Fig. 4). As the parts are shown in Fig. 1, rotation of the drive shaft 11 in forward speeds rotates the pinion 12 which rotate the master gear 13 and gears 22. Since gears 22 mesh with gears 20, the latter are rotated and since the fingers 19 of the housings 18 project between the spokes 21 in the gears 20 the housings 18 are rotated and therefore the axle shafts 17 are rotated. My improved free wheeling mechanism is in ineffective position when the parts are as shown in Fig. 1, but the same is rendered effective in a manner and by means to be described presently.

The control for my improved free wheeling mechanism comprises a hand lever 24 that is intended to be arranged in the driver's compartment of the vehicle and this lever operates a rock shaft 25 on which are oppositely threaded portions 26 about which are meshed collars 28. Each of the collars 28 has an arm 29 attached thereto and each arm 29 carries a yoke that is attached to pins 31 on a ring 20a that fits about the corresponding gear 20 (Fig. 6) whereby the gears 20 may be disengaged from the idler gears 22 by rocking the shaft 25. When the gears 20 are thus disengaged from the gears 22 power from the drive shaft 11 is transmitted directly by gears 12 and 13 to the driven shaft 14 and the free wheeling mechanism embodied in the invention will function by means and in a manner now to be described.

To this end there is splined on each of the shaft portions 32, Fig. 1, a sleeve 33, and around these sleeves are arranged, on antifriction elements 60, rings 34 between the spokes 35 of which portions 18a of the housing 18 project, (Fig. 5), whereby when the driven shaft 14 is rotated, with the free wheeling control lever 24 set in effective position, the sleeves 33, being splined on shaft portions 32, will rotate therewith. Each of the sleeves 33 includes an internally threaded stem portion 36 in which is received an externally threaded hub 37 that floats on the shaft 14 (Fig. 8). Integral with each hub 37 is a plate 38. Arranged between each of the plates 38 and a plate 39 is a disc 40 which is fixed to the shaft 14. Pivotally mounted on the plates 38 and 39 by means of pin and slot connections 46 are the arms of U-shaped elements 42, (Figs. 7 and 8) which carry rollers 43 that ride the periphery 44 of the discs 40. Corresponding notches 45 are provided in the plates 38 and 39 and the rollers 43 are arranged in these notches; the rollers straddling the periphery 44 of each disc 40 under the inner periphery of each of the portions 18b of the housing 18.

When the parts are in the position shown in Fig. 1, and the gears 20 are in mesh with the idler gears 22, and the shaft 14 is rotated, the housings 18 rotate with the shaft 14 since the fingers 19 on the housings 18 project between the spokes 21 of the gears 20, causing the housings 18 to rotate with the shaft 14; and since the axle shafts 17 are integral with the housings 18 (Fig. 1) the axle shafts are rotated and, therefore, also the wheels (not shown) carried by the axle shafts 17. When, however, the free wheeling mechanism control lever 24 is operated to render the free wheeling mechanism effective and to disengage the gears 20 from the idler gears 22, power from the drive shaft 11 is then transmitted by gear 12 to gear 13, thence to the fingers 63 of a clutch element 64 that floats on shaft 14 (Fig. 1) within one of the gear bodies 20. These fingers 63 project through apertures in the master gear 13 and, when the parts are as in Fig. 1, ride against the face of the opposite gear 20. When the gears 20 are spread apart by the yokes 30 the clutch element 64 is urged by a spring 66 into mesh with a clutch element 65 that is fixed to shaft 14, thereby transmitting power to the driven shaft 14 which is, therefore, rotated; and since discs 40 are fixed to shaft 14 these discs will also be rotated, counterclockwise as seen in Fig. 7, whereby the rollers 43 will ride up the cam faces 44a on the periphery 44 of each disc 40. The rollers 43 will, therefore, be frictionally wedged against the inner periphery of the adjacent housing portion 18b, causing the housings 18 to rotate with the shaft 14 and since the axle shafts 17 are integral with the housings 18 the axles, shafts and wheels carried thereby will thus be rotated. The pin and slot connections 46 of the U-shaped elements 42 with the plates 38 and 39 permit the rollers 43 to ride up the cam faces 44a.

When the parts are as shown in Fig. 1 and the drive shaft 11 is rotated to reverse the direction of movement of the vehicle the driven shaft 14, housing 18 and axle shafts 17 will be rotated in the manner described above. This invention includes means, now to be described, by which the free wheeling mechanism described above may be rendered effective when the drive shaft 11 is driven in reverse and the free wheeling control lever 24 is operated to disengage the gears 20 from the idler gears 22, causing driven shaft 14 to rotate clockwise as seen in Fig. 7, and counterclockwise as seen from the right in Fig. 1. To this end there is provided means, presently to be described, for sliding the collars 33 axially along the shaft portions 32 whereby to rotate the hubs 37 and plates 38 in such a manner that the plates 38 will be rotated through the distance from the trough A of one cam face 44a (Fig. 7) to the crest B of the same cam face whereby to wedge the rollers 43 against the inner periphery of each housing portion 18b when the shaft 14 and discs 40 are rotated clockwise, as seen in Fig. 7; and thus to cause the housings 18 and axle shafts 17 to turn with the shaft 14. This shifting of the discs 40 is immediately caused by the axial movement of collars 33 on the shaft portions 32 and the resulting engagement of the externally threaded hubs 37 with the internally threaded extensions 36 of the collars 32. The mechanism which causes the axial movement of collars 33 on the shaft portions 32, when the shafts 11 and 14 are driven in reverse, will now be described.

The shaft 11 includes a worm gear portion 47 about which is arranged a sleeve 48 that rotates with the drive shaft 11 and its worm 47 when the shaft 11 is rotating clockwise as seen looking from right to left in Fig. 4, and the vehicle is moving forwardly. When the driven shaft 11 is rotating in a direction to reverse the vehicle (clockwise, Figs. 2 and 3) the cam 49 (Fig. 3) on the sleeve 48 engages the pivotal dog 50 and prevents rotation of the sleeve 48 with the shaft 11, whereupon the rotation of shaft 11 and its worm gear 47 causes the sleeve 48 to move axially along the shaft 11, toward the left, Fig. 4. Attached to the sleeve 48 is a block 51, the flanges 52 of which move along guideways 53 in the housing 10 when the sleeve is moved axially of the shaft 14, toward the left, Fig. 4. Pivotally attached to the block 51, as at 54, are links 55, the other ends of which are pivotally mounted as at 56 in the housing 10. Each of these links has connected thereto, about the points 56, a yoke 57 which is attached as at 48 (Fig. 5) to a ring 59, one of which surrounds each of the rings 34, the anti-friction elements 60 being provided between the rings 34 and 59. When, therefore, the block 51 is moved toward the left, Fig. 4, and toward the bottom of the page as seen in Fig. 1, the links 55 are spread and the yokes 57 are thus spread apart to move the collars 33 axially along the shaft portions 32, whereby to rotate the collar portions 36. This causes rotation of the hubs 37 and plates 38 that float on shaft 14 (counterclockwise as seen in Fig. 7), a distance equal to the length of one of the notches 45 as represented by the distance between points A and B in Fig. 7. This movement of plates 38 is transmitted to the plates 39 that are similar to plates 38, by the U-shaped elements 42 whereby the rollers 43 will ride up the portions of the cam faces 44a that lie between the points A and B, Fig. 7, whereby when the housings 18 are rotated clockwise, Fig. 7, the rollers 43 will be wedged between the inner peripheries of housing portions 18b and the end portions B of the cam faces 44a, thereby causing the housings 18 and axle shafts 17 to rotate in a direction to reverse the vehicle.

When the drive shaft 11 is again rotated in a direction to move the vehicle forwardly the sleeve 48 will rotate counterclockwise (Fig. 3) and the worm 47 will rotate the sleeve 48 until the cam 61 engages the dog 62 whereupon the sleeve 48 will move axially along the shaft 11, toward the right, Fig. 4, until the parts are again as in Fig. 1, at which time the links 55 will have acted through the yokes 57 to slide the collars 33 axially on the shaft portions 32, thereby positioning the plates 38 and 39, relative to the discs 40, in the position of Fig. 7; in which position the rollers 43 are ready to be wedged between the cam faces 44a and the inner peripheries of housing portions 18b when the housings 18 are rotated counterclockwise as seen in Fig. 7 and the vehicle is moved fowardly.

The invention therefore provides a differential mechanism which will deliver power uniformly to both wheels when the free wheeling mechanism is in effective position as well as when the free wheeling mechanism is in ineffective position whereby in case the vehicle becomes stalled on a slippery place power will be delivered to both wheels to move the vehicle. The free wheeling mechanism in addition has other advantages among which are saving of gas, tires, etc.

While have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In combination with an automotive vehicle differential including a drive shaft and a driven shaft, wheel-bearing axle shafts at the ends of the driven shaft, a pinion gear on the drive shaft and a master gear constantly in mesh therewith and floating on the driven shaft, planetary gears carried by the master gear, mechanisms to transmit motion of the planetary gears to the axle shafts including housings each connected at one end to the axle shafts and including beveled gears meshing with the planetary gears and rotatable with the housings, means to disengage the beveled gears from the planetary gears, mechanism operated by said means to transmit motion of the master gear to the driven shaft when the beveled gears are disengaged from the planetary gears, and mechanisms within said housings cooperating therewith to transmit motion of the driven shaft to the axle shafts when the beveled gears are disengaged from the planetary gears.

2. In combination with an automotive vehicle differential including a drive shaft and a driven shaft, wheel-bearing axle shafts at the ends of the driven shaft, a pinion gear on the drive shaft and a master gear constantly in mesh therewith and floating on the driven shaft, planetary gears carried by the master gear, mechanisms to transmit motion of the planetary gears to the axle shafts including housing each connected at one end to the axle shafts and including beveled gears rotatable with the housings and meshing with the planetary gears, means to disengage the beveled gears from the planetary gears, mechanism operated by said means to transmit motion of the master gear to the driven shaft when the beveled gears are disengaged from the planetary gears, and mechanisms within said housings cooperating therewith to transmit either forward or reverse motion of the driven shaft to the axle shafts when the beveled gears are disengaged from the planetary gears.

3. In combination with an automotive vehicle differential including a drive shaft and a driven shaft, wheel-bearing axle shafts at the ends of the driven shaft, a pinion gear on the drive shaft and a master gear constantly in mesh therewith and floating on the driven shaft, planetary gears carried by the master gear, mechanisms to transmit motion of the planetary gears to the axle shafts and including beveled gears rotatable with the housings and meshing with the planetary gears, means to disengage the beveled gears from the planetary gears, mechanism operated by said means to transmit motion of the master gear to the driven shaft when the beveled gears are disengaged from the planetary gears, mechanisms within said housing cooperating therewith to transmit either forward or reverse motion of the driven shaft to the axle shafts when the beveled gears are disengaged from the planetary gears, and means automatically operated by the drive shaft to arrange the last-mentioned mechanisms for cooperation with the housings whereby to transmit motion of the driven shaft to the axle shafts in either forward or reverse motion of the former when the beveled gears and planetary gears are disengaged.

In testimony whereof I affix my signature.

JOE JAEGERHUBER.